June 12, 1945.   D. M. LIGHT   2,378,229
CAR TRUCK
Filed Jan. 7, 1942   2 Sheets-Sheet 1

INVENTOR.
David M. Light
BY
ATTORNEY.

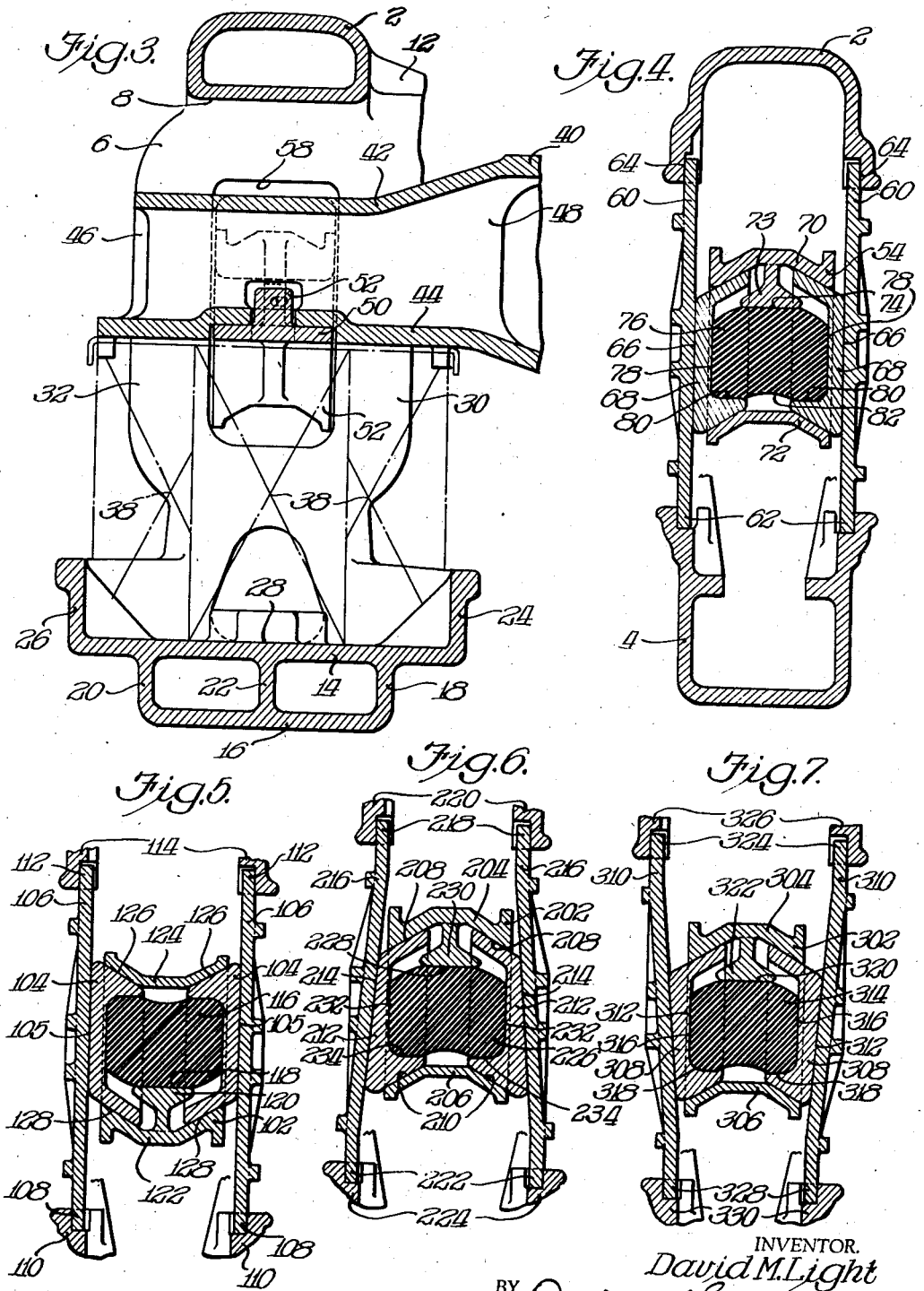

Patented June 12, 1945

2,378,229

UNITED STATES PATENT OFFICE 2,378,229

CAR TRUCK

David M. Light, Chicago, Ill., assignor to American Steel Foundries, Chicago, Ill., a corporation of New Jersey Application January 7, 1942, Serial No. 425,825

32 Claims. (Cl. 105—197)

My invention relates to railway freight car trucks and especially to a four wheel freight car truck of quick wheel change type utilizing the usual type of spaced side frames and the intervening load carrying member or bolster.

My inventoin is directed particularly to the improvement of a known form of such freight car truck wherein an interlocking member is associated with each side frame, and said interlocking member is extended through the columns to operate in conjunction with friction means mounted in the window openings adjacent the columns.

The general object of my invention is to devise an improvement of such freight car trucks as that described which may simplify the application of friction means whether of constant friction type or of varying friction type, my novel arrangement permitting the convenient assembly of either modification.

A specific object of my invention is to devise a quick wheel change freight car truck of the above general arrangement wherein the interlocking member associated with each side frame may have yoke end portions extending through the columns for support of friction shoes which may engage friction panels carried on the frame.

In each modification, I may so arrange the friction shoes mounted in each yoke portion that they may have diagonal face engagement with said yoke portion along a plurality of surfaces, certain of which may have maximum bearing on the up stroke and certain of which may have maximum bearing on the down stroke. I may reverse the position of the diagonal surfaces in some modifications as compared with others.

Another object of my invention is to devise a freight car truck of the above general type wherein the yoke portion at each end of the interlocking member may house a single resilient pad so constructed and arranged as to afford a direct force path between spaced friction shoes as well as between each of said shoes and a wall of said yoke portion. My novel arrangement also contemplates a structure wherein out of squareness between the bolster and side frame will be resisted by the friction devices actuated by the interlocking member, such out of squareness tending further to compress the resilient member associated with each end of each interlocking member and being resisted by the friction developed between diagonally arranged surfaces on the friction shoes and the yoke of the interlocking member.

In the drawings,

Figure 3 is a sectional view through the truck structure shown in Figures 1 and 2, the section being taken substantially in the vertical plane bisecting the truck transversely as indicated by the line 3—3 of Figure 1.

Figure 4 is a further sectional view through the truck structure taken substantially in the vertical transverse plane indicated by the line 4—4 of Figure 1.

Figures 5, 6, and 7 are alternate views comparable to the showing of Figure 4 and illustrating modifications of my invention.

Figure 1:
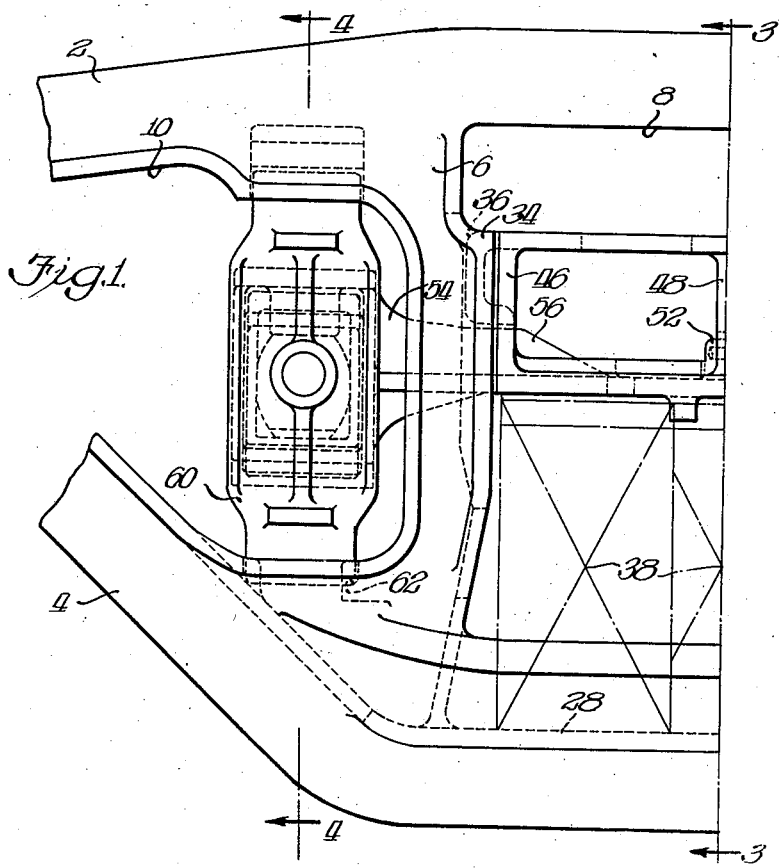
Figure 1 is a fragmentary side elevation of a freight car truck embodying my invention.
Figure 2:
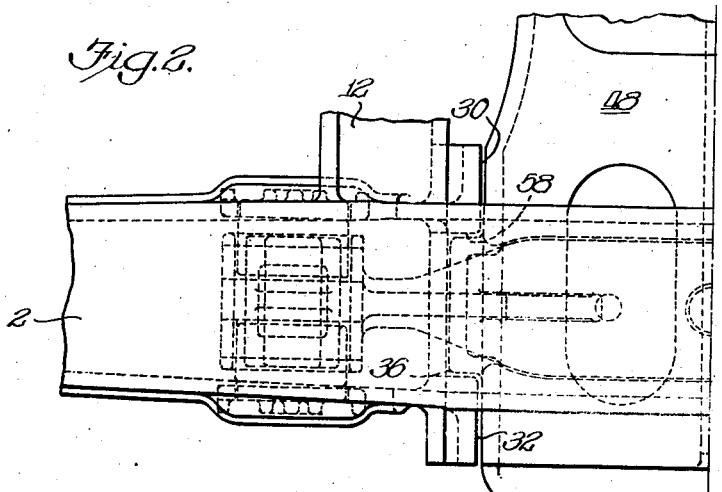
Figure 2 is a fragmentary top plan view of the truck structure shown in Figure 1.

Describing the structure in detail, my novel truck arrangement comprises a truss side frame having a compression member 2 and a tension member 4, between which adjacent each end of the frame may be connected an integral column 6, said column defining with said tension and compression members a central bolster opening 8 at each side of which may be the usual window opening 10. Over the bolster opening the compression member may have the box-section as best shown in Figure 3, and on said compression member adjacent its juncture with each column 6 may be formed the usual brake hanger bracket 12, a fragment only of which is shown. Below the bolster opening 8, the tension member may have a well known shape including the box-section defined by the top chord 14, the bottom chord 16, inboard and outboard walls 18 and 20, and the longitudinal rib 22. The top chord 14 may be widened beneath the bolster opening 8 and formed with upstanding inboard and outboard flanges 24 and 26 defining therewith the spring seat 28, said inboard and outboard flanges converging adjacent their ends to merge with the lower portions of the columns in well known manner. Each column is of relatively greater width transversely of the truck, and formed with inboard and outboard legs, along the central portions of which inboard and vertically arranged outboard bolster guide surfaces 30 and 32 may be formed, the top of each bolster guide surface being defined by the shoulder 34 (Figure 1), said shoulder 34 being spaced from the compression member thereabove to define therewith and with said columns a relatively wide portion of the bolster opening 8. Said relatively wide portion of the bolster opening may have a restricted depth slightly greater than that of the guide pad 36 on each side wall of the bolster, said guide pads thus being insertable in the top of the bolster opening and receivable between the inboard and outboard bloster guide portions of each column, so that the bolster may be assembled with or dismantled from the side frame without disturbing the supporting springs or the interlocking member.

On the spring seat 28 may be supported in usual manner, a plurality of coil springs (diagrammatically indicated at 38, 38) and supported on said springs may be the end of the bolster generally designated 40, said bolster having an end portion of well known box structure form comprising the top wall 42, the bottom wall 44, side walls 46, 46, and the central rib 48. Recessed within the bottom wall 44 of the bolster may be the flat central plate portion of the interlocking member generally designated 50, said interlocking member having the centrally positioned lug 52 extending through the bottom wall of the bolster for interlocking engagement therewith in well known manner, and also having at each end thereof an enlarged yoke-like end portion 54. The enlarged end portion 54 may merge with the central plate portion and be reinforced by the vertical rib 56 which may extend through an accommodating slot in the adjacent side wall 46 of the bolster thus affording additional interlocking engagement therewith. The lateral dimension of the yoke end portion 54 of the interlocking member is such as to conveniently admit it within the vertically arranged rectangular opening 58 of the column, said opening separating the inboard and outboard legs of the column on which are formed the before-mentioned bolster guide surfaces 30 and 32.

In each window opening 10 may be mounted inboard and outboard friction panels 60, 60, the lower ends of said panels being recessed in slots as at 62, 62 in the inboard and outboard walls of the tension member adjacent its juncture with the nearby column, and the upper ends thereof may seat as at 64, 64 against ledges formed on the inboard and outboard walls of the compression member. Each friction panel 60 may have on its outer face any convenient arrangement of reinforcing ribs and may present a substantially smooth inner face which may have frictional engagement as at 66 with a friction shoe 68, the friction shoes at opposite sides of the device being substantially identical and each friction shoe being slidably receivable between diagonally arranged portions of the top and bottom walls 70 and 72 (Figure 4). Depending from the top wall 70 of the yoke portion 54 may be a saddle member 73 presenting a flat smooth seat for abutment as at 74 with the resilient pad 76, said pad consisting of a solid block of rubber composition or other suitable material. The pad 76 may have large lateral bearing against each friction shoe as at 78, 78 and vertical bearing thereagainst as at 80, 80 as well as against the before-mentioned saddle portion 73. The resilient member 76 may be relieved slightly as at 82 (Figure 4) to form a shallow channel thus affording clearance from the shoe bearings at 80, 80. All surfaces of the shoes and of the saddle member 73 which may abut the resilient pad 76 are formed with smooth radii at edges and corners in order to prevent undue abrasion thereof.

In the embodiment illustrated in Figure 4, it will be observed that any out of square movement of the bolster with respect to the side frame will tend to move the interlocking member out of square with the associated side frame and this movement will be resisted by the frictional engagement of the shoes with the friction panels as well as by the friction developed on the surfaces of the shoes engaging the yoke portion of the interlocking member. At the same time, any vertical movement of the bolster with respect to the side frame will be snubbed by the friction developed as already described.

The modification illustrated in Figure 5 differs from that of Figure 4, only in that the yoke portion 102 of the interlocking member is inverted. The structure is otherwise the same with the friction shoes 104, 104 in flat face frictional engagement as at 105, 105 with the friction panels 106, 106, the lower ends of which may be positioned as at 108, 108 with respect to the spaced walls of the tension member 110 and the upper ends of which may be positioned as at 112, 112 with respect to the spaced walls of the compression member 114. Within the friction shoes 104, 104 may be housed the resilient member 116, the bottom face of which may bear as at 118 upon the saddle portion 120 formed as an integral part of the bottom wall 122 of the yoke portion 102, the top wall 124 of said yoke portion as well as said bottom wall 122 having diagonally arranged portions at opposite sides thereof between which may be received the friction shoes 104, 104 in frictional engagement therewith as at 126, 126 and 128, 128 respectively. The friction shoes 104, 104 are identical with the friction shoes 168, 168 but of course are reversed in position.

The modifications of Figures 6 and 7 correspond generally to the respective modifications of Figures 4 and 5 except that in Figure 6 the spaced friction panels are arranged with downwardly diverging friction surfaces, while in Figure 7 the friction panels are arranged with upwardly diverging friction surfaces.

In Figure 6 the yoke portion 202 of the interlocking member may be identical with the yoke portion 54 (Figure 4), the top and bottom walls 204 and 206 thereof having diagonal portions for frictional engagement as at 208, 208 and 210, 210 respectively with the spaced friction shoes 212, 212, each of which may have flat face engagement as at 214 with the adjacent tapering face of the adjacent friction panel 216. Each friction panel 216 may be positioned as at 218, 218 with respect to the spaced walls of the compression member 220, and similarly at their lower ends may be positioned as at 222, 222 with respect to the spaced walls of the tension member 224. In this modification the resilient pad 226 may be substantially identical with the previously described resilient members, the top thereof bearing as at 228 against the saddle portion 230, the lateral sides thereof bearing as at 232, 232 against the respective friction shoes and additional bearing against said shoes being afforded as at 234, 234. In this modification each friction shoe is formed with a back wall having a tapering friction surface complementary to that of the tapering surface of the adjacent friction plate 216, otherwise the friction shoes are similar to those of the previous modifications.

In the modification of Figure 7, the yoke end portion 302 of the interlocking member may be identical with the yoke portions 54 and 202 (Figures 4 and 6 respectively) and the top and bottom walls 304 and 306 may have diagonally arranged portions between which the friction shoes 308, 308 may have slidable frictional movement as the yoke portion 302 moves vertically with respect to the friction panels 310, 310 which of course are fixed with respect to the side frame, while the interlocking member carrying the yoke 302 is tied to the spring supported bolster. In this modification each friction shoe 308 may have flat face engagement as at 312 with the adjacent friction panel 310, said friction panels being formed with upwardly diverging friction surfaces. The friction shoes 308, 308 may house the resilient pad 314 in the manner of the previous modification, said pad bearing laterally against the shoes as at 316, 316 and vertically thereagainst as at 318, 318 and also having vertical bearing as at 320 against the saddle portion 322 formed as an integral part of the yoke 304. In this arrangment as in the other modifications, the upper ends of the friction panels 310, 310 may be positioned as at 324, 324 with respect to the compression member 326, and the lower ends thereof may similarly be positioned as at 328, 328 with respect to the tension member 330.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard panels in each of said window openings, and friction shoes slidably supported from said interlocking member in frictional engagement with said panels, the friction shoes at each end of said interlocking member being arranged in opposed relationship with a resilient member compressed therebetween, said resilient member affording a direct force path from each of said shoes to a wall of the adjacent end portion.

2. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard panels in each of said window openings, and friction shoes slidably supported from said interlocking member in frictional engagement with said panels, the friction shoes at each end of said interlocking member being arranged in opposed relationship with a resilient member compressed therebetween, said resilient member affording a horizontal force path between the associated shoes and a vertical force path between each shoe and a wall of the adjacent end portion.

3. In a railway car truck, a side frame having tension and compression members and spaced columns defining a central bolster opening and window openings, slots in said columns aligned longitudinally of said frame, a bolster end spring supported from said frame in guiding engagement with said columns, friction panels supported in each of said window openings, an interlocking member associated with said side frame and bolster with yoke-like end portions supporting friction shoes in engagement with said panels respectively, each of said yoke-like end portions supporting a pair of opposed friction shoes in diagonal engagement with spaced walls thereof and in vertical engagement with said panels, and a resilient member under compression between each pair of shoes.

4. In a railway car truck, a side frame, a bolster spring supported therefrom, an interlocking member associated with said side frame and bolster, spaced friction panels on said side frame at each side of said bolster, said interlocking member having yoke-like end portions extending laterally of said bolster and slidably supporting friction shoes for engagement with the respective panels, said friction shoes in each yoke portion having diagonal slidable engagement therewith and being in opposed relationship, and a resilient member compressed between the opposed shoes and affording a horizontal force path therebetween, said resilient member also affording a vertical force path between said shoes and a wall of the adjacent yoke portion.

5. In a railway car truck, a side frame having tension and compression members and spaced columns defining a central bolster opening and window openings, slots in said columns aligned longitudinally of said frame, a bolster end spring supported from said frame in guiding engagement with said columns, friction panels supported in each of said window openings, and an interlocking member associated with said side frame and bolster with yoke-like end portions supporting friction shoes in engagement with said panels respectively, each of said yoke-like end portions supporting a pair of opposed friction shoes in diagonal engagement with spaced walls thereof and in vertical engagement with said panels.

6. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard upwardly diverging panels in each of said window openings, and friction shoes slidably supported from said interlocking member in frictional engagement with said panels, the friction shoes at each end of said interlocking member being arranged in opposed relationship with a resilient member compressed therebetween, said resilient member also affording a vertical force path between each shoe and the adjacent end portion.

7. In a railway car truck, a side frame, a bolster spring supported therefrom, an interlocking member associated with said side frame and said bolster and having yoke end portions housing friction shoes at opposite sides of said bolster, spaced inboard and outboard panels on said side frame in frictional engagement with the adjacent shoes, and a resilient member compressed between each yoke portion and the associated shoes, said resilient member affording a direct horizontal force path between adjacent shoes and a vertical force path between each shoe and a wall of the associated yoke.

8. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard panels in each of said window openings, friction shoes supported from the ends of said interlocking member in diverging diagonal face engagement with said panels, and resilient means affording a direct horizontal force path between adjacent shoes and a vertical force path between each shoe and a wall of the adjacent end portion.

9. In a railway car truck, a side frame, a bolster spring supported therefrom, an interlocking member associated with said side frame and said bolster, friction panels on said side frame at opposite sides of said bolster, said interlocking member housing at each end thereof friction shoes for engagement with the adjacent panels, and a resilient member under compression between said shoes and a portion of said interlocking member, said resilient member being laterally compressed between opposed shoes and vertically compressed between a wall of said interlocking member and opposed portions of said shoes.

10. In a railway car truck, a side frame, a bolster spring supported therefrom, an interlocking member associated with said side frame and bolster, sets of spaced friction panels on said side frame, said interlocking member having yoke-like end portions extending laterally of said bolster and slidably supporting friction shoes for engagement with the respective sets, said friction shoes in each yoke portion having diagonal slidable engagement therewith and being in opposed relationship, and a resilient member compressed between the opposed shoes and affording a horizontal force path therebetween.

11. In a railway car truck, a side frame, a bolster spring supported therefrom, an interlocking member associated with said side frame and said bolster, friction panels on said side frame at opposite sides of said bolster, said interlocking member housing at each end thereof friction shoes for engagement with the adjacent panels, and a resilient member under compression between said shoes and a portion of said interlocking member, said resilient member affording a direct force path between the opposed shoes and between each shoe and a wall of said interlocking member.

12. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard panels in each of said window openings, pairs of friction shoes supported from the respective ends of said interlocking member in engagement with said panels, and resilient means compressed between the shoes of each pair and affording a horizontal force path therebetween and a vertical force path between at least one of said shoes and the adjacent end portion.

13. In a railway car truck, a truss side frame having tension and compression members and columns defining a bolster opening and lateral window openings, slots in said columns aligned longitudinally of said frame, a bolster end in said bolster opening spring supported from said frame, an interlocking member associated with said side frame and bolster with end portions projecting through said slots, inboard and outboard downwardly diverging panels in each of said window openings, friction shoes slidably supported from said interlocking member in frictional engagement with said panels, and a resilient pad horizontally compressed between adjacent shoes and vertically compressed between said shoes and the adjacent end portion.

14. In a railway car truck, a side frame, a bolster spring supported therefrom, an interlocking member associated with said side frame and bolster, sets of spaced friction panels on said side frame, said interlocking member having yoke-like end portions extending laterally of said bolster and slidably supporting friction shoes for engagement with the respective sets, said friction shoes in each yoke portion having diagonal slidable engagement therewith and being in opposed relationship.

15. In a railway car truck, a side frame, a bolster spring supported therefrom, an interlocking member associated with said side frame and said bolster and having yoke end portions housing a pair of friction shoes at each side of said bolster, spaced inboard and outboard panels on said side frame in frictional engagement with the adjacent shoes, and a resilient member compressed between each yoke portion and the associated shoes, and affording a direct force path between adjacent shoes and between each shoe and the adjacent yoke portion.

16. In a railway car truck, a side frame, a bolster spring supported therefrom, an interlocking member associated with said side frame and said bolster, friction panels on said side frame at opposite sides of said bolster, said interlocking member housing at each end thereof friction shoes for engagement with the adjacent panels, and a resilient member vertically and horizontally compressed between each interlocking member end and the adjacent shoes.

17. In a railway car truck, a side frame, a bolster spring supported therefrom, an interlocking member associated with said side frame and said bolster, friction panels on said side frame at opposite sides of said bolster, said interlocking member housing at each end thereof friction shoes for engagement with the adjacent panels, and a resilient member under vertical and horizontal compression between said shoes and a portion of said interlocking member.

18. In a railway car truck, a side frame, a bolster spring supported therefrom, an interlocking member associated with said side frame and said bolster, opposed friction panels on said side frame at opposite sides of said bolster, said interlocking member housing at each end thereof a pair of friction shoes for engagement with the adjacent panels, and resilient means compressed between each interlocking member end and the adjacent pair of shoes and affording a direct force path between opposed shoes and between each shoe and the associated end.

19. In a railway car truck, a side frame, a bolster spring supported therefrom, an interlocking member associated with said side frame and bolster, sets of opposed friction panels on said side frame, said interlocking member having yoke-like end portions extending laterally of said bolster and slidably supporting friction shoes for engagement with the respective sets, and a rubber pad compressed between the shoes of each set and affording a direct force path between each shoe and the adjacent end portion.

20. In a railway car truck, a side frame comprising spaced columns partly defining a bolster opening and spaced windows, friction devices on said frame in said windows, and a bolster resiliently supported in said opening and having an associated member operatively connected to said devices, each of said devices comprising spaced friction shoes, resilient means compressed therebetween, and reversely arranged wedge faces on said shoes engaging the adjacent associated member.

21. In a railway car truck, a side frame comprising spaced columns partly defining a bolster opening and spaced windows, friction devices on said frame in said windows, openings in said columns, and a bolster resiliently supported in said bolster opening and having an associated member operatively connected through said column openings to said devices, each of said devices comprising opposed friction shoes in wedge engagement with said associated member and resilient means vertically and horizontally compressed between said shoes and said member.

22. In a railway car truck, a side frame comprising spaced columns partly defining a bolster opening and spaced windows, a bolster resiliently supported in said opening, means mounted on said frame in at least one of said windows for frictionally resisting movement of said bolster in every direction, and a member operatively connecting said bolster and said means, each of said means comprising a pair of friction shoes in wedge engagement with said member and resilient means vertically and horizontally compressed between said shoes and member.

23. In a railway car truck, a side frame comprising spaced columns partly defining a bolster opening and spaced windows at opposite sides thereof, an opening in at least one of said columns, a bolster resiliently supported in said bolster opening, means on said frame in the window adjacent the last-mentioned column for frictionally resisting vertical and out of square movements of said bolster, and an actuating member connected between said bolster and said means through said column opening, each of said means comprising a pair of friction shoes in wedge engagement with said actuating member and a resilient pad vertically and horizontally compressed between said shoes and said member.

24. In a vehicle, relatively movable members, spaced friction surfaces on one of said members, a carrier interposed between said surfaces, friction shoes housed in said carrier in frictional engagement therewith and with said surfaces along diverging planes, resilient means under compression between said shoes, and an operative connection between said carrier and the other member.

25. In a vehicle, relatively movable members, spaced friction surfaces on one of said members, a carrier interposed between said surfaces, friction shoes housed in said carrier in frictional engagement therewith and with said surfaces along diverging planes, resilient means vertically and horizontally compressed by and between said shoes and a wall of said carrier, and an operative connection between said carrier and the other member.

26. In a vehicle, relatively movable members, oppositely spaced friction surfaces on one of said members, a carrier, friction shoes housed in said carrier in frictional engagement therewith and with said surfaces, resilient means affording a direct force path from each shoe to the other thereof and from each shoe to a wall of said carrier, and an operative connection between said carrier and the other of said members.

27. In a railway car truck, a side frame having spaced columns partly defining spaced windows and an intermediate bolster opening, a friction device in at least one of said windows, an opening in the adjacent column, said device comprising spaced friction surfaces on the frame, a yoke member, a friction shoe in frictional engagement with each surface and said member along diagonal planes, resilient means urging said shoe into said engagement, a bolster resiliently supported in said bolster opening, and an operative connection between said bolster and said yoke member through said column opening.

28. In a vehicle, relatively movable members, spaced substantially parallel friction surfaces on one of said members, friction shoes engaging respective surfaces, means for moving said shoes under greater pressure against said surfaces in one direction than in the opposite direction, an operating element connected between the other of said members and said means, and a resilient pad vertically and horizontally compressed between said shoes and said element.

29. In a vehicle, relatively movable members and spaced substantially parallel friction surfaces on one of said members, friction shoes engaged with respective surfaces, means for moving said shoes under greater pressure against said surfaces in one direction than in the opposite direction, and an operative connection between the other of said members and said means, said means comprising a yoke housing said shoes and in diagonal frictional engagement with opposite ends thereof and resilient means under compression between said shoes.

30. In a vehicle, relatively movable members and spaced substantially parallel friction surfaces on one of said members, friction shoes engaged with respective surfaces, means for moving said shoes under greater pressure against said surfaces in one direction than in the opposite direction, and an operative connection between the other of said members and said means, said means comprising a yoke housing said shoes and in diagonal frictional engagement with opposite ends thereof and resilient means compressed by and between said shoes and a wall of said yoke.

31. In a vehicle, relatively movable members, oppositely spaced friction surfaces on one of said members, friction shoes engaged with respective surfaces, a yoke housing said shoes and in diagonal frictional engagement with opposite ends thereof, resilient means under compression between said shoes, and an operative connection between the other of said members and said yoke.

32. In a vehicle, relatively movable members, oppositely spaced friction surfaces on one of said members, friction shoes engaged with respective surfaces, means for moving said shoes under greater pressure against said surfaces in one direction than in the opposite direction, said means comprising a yoke housing said shoes and in diagonal frictional engagement with each shoe at opposite ends thereof along substantially parallel planes, and resilient means under compression between said shoes, and an operative connection between the other of said members and said yoke.

DAVID M. LIGHT.